US010417495B1

(12) United States Patent
Davami (10) Patent No.: US 10,417,495 B1
(45) Date of Patent: Sep. 17, 2019

(54) SYSTEMS AND METHODS FOR DETERMINING BIOMETRIC INFORMATION (71) Applicant: Google LLC, Mountain View, CA (US)

(72) Inventor: Erfan Davami, Mountain View, CA (US)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 15/670,030

(22) Filed: Aug. 7, 2017

Related U.S. Application Data (60) Provisional application No. 62/371,877, filed on Aug. 8, 2016.

(51) Int. Cl.
*G06K 9/00* (2006.01)
*A61B 3/14* (2006.01)
*G06T 7/13* (2017.01)
*G06T 7/73* (2017.01)
*G06T 7/62* (2017.01)
*G06K 9/48* (2006.01)

(52) U.S. Cl.
CPC ....... *G06K 9/0061* (2013.01); *G06K 9/00604* (2013.01); *G06K 9/481* (2013.01); *G06T 7/13* (2017.01); *G06T 7/62* (2017.01); *G06T 7/74* (2017.01); *G06T 2207/10028* (2013.01); *G06T 2207/30201* (2013.01)

(58) Field of Classification Search
USPC ....... 382/100, 103, 106, 117, 123, 128, 154, 382/162, 168, 172–173, 181, 194, 199, 382/209, 219, 220, 232, 254, 274, 276, 382/286–291, 305, 312; 345/633; 351/206
See application file for complete search history.

(56) References Cited

U.S. PATENT DOCUMENTS

| | | | |
|---|---|---|---|
| 6,229,907 B1 * | 5/2001 | Okano | G06K 9/00268 382/117 |
| 7,682,026 B2 | 3/2010 | Huffman et al. | |
| 2008/0049185 A1 * | 2/2008 | Huffman | A61B 3/113 351/206 |

(Continued)

OTHER PUBLICATIONS

Swirski, et al. "Robust real-time pupil tracking in highiy off-axis images" 2012, pp. 173-176.*

(Continued)

*Primary Examiner* — Seyed H Azarian
(74) *Attorney, Agent, or Firm* — McDonnell Boehnen Hulbert & Berghoff LLP (57) ABSTRACT

Described herein are systems and methods for detecting a gaze direction and/or pupil dimension of an eye based on an image of the eye. Example systems and methods include: (i) capturing an image of an eye; (ii) based on the image, determining a set of edge pixels corresponding with an edge of a pupil of the eye; (iii) selecting at least one subset of pixels from the set of edge pixels; (iv) fitting an ellipse to each subset of pixels; (v) determining a respective confidence value for each fitted ellipse based on a distance between each pixel of the set of pixels and an edge of the respective fitted ellipse; (vi) determining a best-fit ellipse based on the respective confidence value(s); and (vii) determining, based on the best-fit ellipse, at least one of a gaze direction of the eye or a pupil dimension of the eye.

19 Claims, 8 Drawing Sheets

(56) References Cited

U.S. PATENT DOCUMENTS

2014/0112535 A1* 4/2014 Chen .................. G06K 9/00382
382/103
2016/0085302 A1* 3/2016 Publicover .............. G06F 21/64
345/633
2016/0335475 A1* 11/2016 Krenzer ............. G06K 9/00335

OTHER PUBLICATIONS

Safaee-Rad, R. et al., "Three-Dimensional Location Estimation of Circular Features for Machine Vision," IEEE Transactions on Robotics and Automation, vol. 8, No. 5, Oct. 1992, pp. 624-640.
Swirski, L. et al., "Robust real-time pupil tracking in highly off-axis images," Proceedings of the Symposium on Eye Tracking Research and Applications, 2012, pp. 173-176.
Swirski, L. et al., "A fully-automatic, temporal approach to single camera, glint-free 3D eye model fitting," 2013, pp. 1-10, available at https://www.cl.cam.ac.uk/research/rainbow/projects/eyemodelfit/.

* cited by examiner

SYSTEMS AND METHODS FOR DETERMINING BIOMETRIC INFORMATION

CROSS-REFERENCE TO RELATED DISCLOSURES

This disclosure claims priority to U.S. Provisional Patent Application No. 62/371,877 filed on Aug. 8, 2016, which is incorporated herein by reference in its entirety.

BACKGROUND

Unless otherwise indicated herein, the materials described in this section are not prior art to the claims in this application and are not admitted to be prior art by inclusion in this section.

Camera-based systems may be used to measure a gaze direction of an eye to determine a direction in which a person is looking or an object at which a person is looking. For example, some camera-based systems may illuminate an eye with a light source and detect reflections (i.e., glints) of the illumination light by imaging the eye. Based on a position of the glint in an image of the eye, a viewing direction of the eye may be determined.

SUMMARY

In one aspect, a method includes: (i) capturing an image of an eye; (ii) determining a best-fit ellipse with respect to a pupil of the eye using an edge detection method, where the edge detection method includes: (a) based on the image, determining a set of pixels corresponding with an edge of the pupil, (b) selecting at least one subset of pixels from the set of pixels corresponding with the edge of the pupil, (c) fitting an ellipse to each subset of pixels, (d) determining a respective confidence value for each fitted ellipse based on a distance between each pixel of the set of pixels and an edge of the respective fitted ellipse, and (e) determining the best-fit ellipse based on the respective confidence value(s); and (iii) determining, based on the best-fit ellipse, at least one of a gaze direction of the eye or a pupil dimension of the eye.

In another aspect, a method includes: (i) capturing an image of an eye; (ii) based on the image, determining a best-fit ellipse with respect to a pupil of the eye using a pixel intensity gradient method, where the pixel intensity gradient method includes: (a) generating a plurality of ellipses, (b) superimposing each of the plurality of ellipses on the image of the eye, (c) for each ellipse of the plurality of ellipses, determining a pixel intensity gradient, where the pixel intensity gradient is based on a difference in pixel intensity between pixels located inside each respective ellipse and pixels located outside each respective ellipse, and (d) determining the best-fit ellipse based on the respective pixel intensity gradient(s); and (iii) determining, based on the best-fit ellipse, at least one of a gaze direction of the eye or a pupil dimension of the eye.

In another aspect, a system includes: (i) a camera positioned for capturing an image of an eye; (ii) a processor; and (iii) a non-transitory computer-readable medium including program instructions that, when executed by the processor, cause performance of a set of functions including: (a) causing the camera to capture an image of the eye; (b) based on the image, determining a set of pixels corresponding with an edge of a pupil of the eye; (c) selecting at least one subset of pixels from the set of pixels corresponding with the edge of the pupil; (d) fitting an ellipse to each subset of pixels; (e) determining a respective confidence value for each fitted ellipse based on a distance between each pixel of the set of pixels and an edge of the respective fitted ellipse; (f) determining a best-fit ellipse based on the respective confidence value(s); and (g) determining, based on the best-fit ellipse for the pupil of the eye, at least one of a gaze direction of the eye or a pupil dimension of the eye.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. OVERVIEW

Example embodiments disclosed herein relate to determining a gaze direction of an eye based on an image of the eye. Conventional gaze detection methods may require light sources for illuminating the eye to detect glints. However, the present disclosure relates to determining the gaze direction based only on one or more images of the eye.

In particular, example embodiments disclosed herein involve fitting an ellipse to the image of the pupil of the eye. In some examples, a best fit ellipse may be determined by fitting an ellipse to a number of pixels of the image that correspond to an edge of the pupil. In other examples, the best fit ellipse may be determined based on the pixel intensities of pixels located inside and outside of various ellipses overlaid on the image.

Based on the best fit ellipse, a circle may be determined in three-dimensional coordinates, where the circle corresponds with the pupil depicted in the image. The circle may be determined using projective geometry. A vector normal to the plane of the circle may align with the gaze direction of the eye.

Further, by determining a number of circles corresponding with multiple images of the pupil in which the eye appears in various orientations, a center point of the eyeball may be determined. Specifically, the center point may be identified by an intersection point of the vectors normal to each of the circles.

II. ILLUSTRATIVE SYSTEMS AND METHODS

Figure 1A:
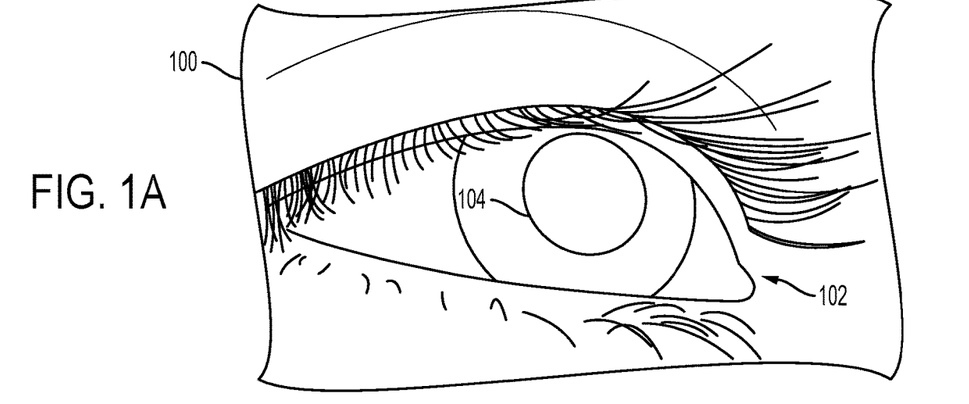
FIG. 1A is an image of an eye, according to an example embodiment.

FIG. 1A depicts an image 100 of an eye 102, according to an example embodiment. In some examples, the image 100 may be captured by a camera of a head-mountable device (HMD). For instance, a field of view of the HMD camera may include the HMD wearer's face such that the image 100 is an image of the wearer's eye 102. The image 100 includes a pupil 104 of the eye 102. By applying various image processing techniques to the image 100, as described herein, a size and orientation of the pupil 104 as well as a gaze direction of the eye 102 may be determined.

In order to estimate a size of the pupil 104 and a gaze direction of the eye 102, the pupil 104 may be approximated as a circle in three-dimensional (3D) space. As such, in a two-dimensional (2D) image of the eye 102 in which the pupil 104 is not perfectly orthogonal to the plane of the image, such as image 100, the pupil 104 may appear as an ellipse. Accordingly, an ellipse may be fitted to the 2D plane of the image 100 of the pupil 104, and, based on the fitted ellipse, a circle in 3D space corresponding to the pupil 104 may be determined through projective geometry. A radius of the determined circle may correspond to a radius of the pupil 104, and a vector normal to the determined circle may correspond to the gaze direction of the eye 102.

Figure 1B:
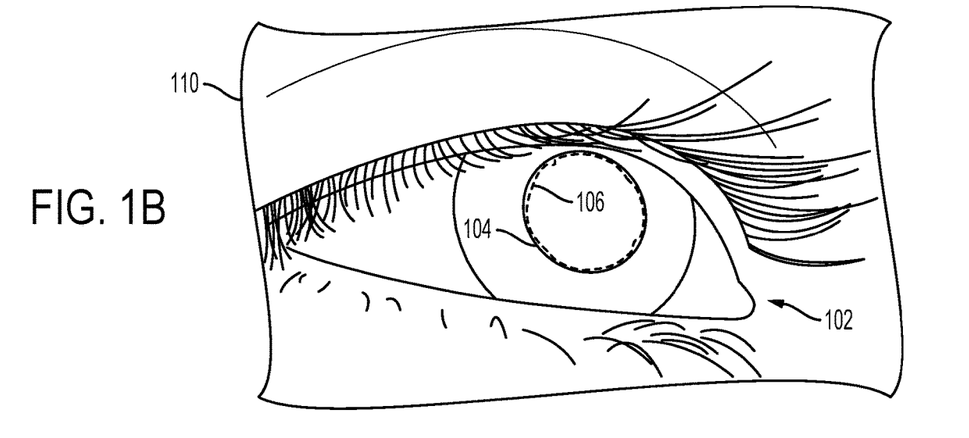
FIG. 1B is an image of an eye, according to an example embodiment.

In order to fit an ellipse to the pupil 104, an edge detection method may be used in which a number of edge pixels corresponding with an outer edge of the pupil 104 are identified. FIG. 1B depicts an image 110 of the eye 102 in which a number of such edge pixels 106 corresponding with the outer edge of the pupil 104 are overlaid on the eye 102. The edge of the pupil 104 and the corresponding edge pixels 106 may be identified through various image processing techniques.

For instance, in some examples, the edge pixels 106 may be determined using Haar-like object recognition. In such examples, pixels within the pupil 104 may be identified based on the fact that pixels within the pupil 104 are much darker than pixels surrounding the pupil (e.g., pixels in the iris or sclera). In practice, image 100 may be convolved with a Haar-filter having a square region with a negative value (e.g., black area) surrounded by a region with a positive value (e.g., white area). In order to account for variations in pupil size (e.g., due to dilation resulting from ambient light levels), image 100 may be convolved with multiple Haar-filters, such as the one described above, but with each having a negative value square region with a different radius. Based on the multiple convolutions, the pixel of image 100 having the strongest response may be estimated as the center of the pupil 104.

However, such convolving may be computationally intensive. Thus, in order to improve computational efficiency, an integral image of image 100 may first be calculated. Calculating the integral image may involve preprocessing image 100 to recursively compute for each pixel of image 100 the summation of all pixel intensities above and to the left of a given pixel. Once the integral image is calculated, the sum of pixel intensities within any given rectangle of image 100 can be determined using only the pixels corresponding to the four corners of the rectangle. Accordingly, by preprocessing image 100 to calculate the integral image, multiple Haar-filters may be rapidly applied to image 100 to identify the pixel of image 100 having the strongest response.

The above-described Haar-like object recognition method may allow for real-time location of the pupil 104 within image 100. However, such a Haar-filter may be used to determine a square of pixels within image 100 that contains the pupil 104, and since the pupil 104 as depicted in image 100 is circular or elliptical (depending on the viewing angle), further image processing may be applied to the determined square to more accurately identify the pupil 104.

For example, once a square surrounding the pupil 104 is determined using Haar-like object recognition, the pixels within the square may be segmented as either part of the pupil 104 or not, based on the intensity of each pixel. In a grayscale image, pixels having a low intensity are darker than those having a high intensity. Thus, pixels having an intensity below a threshold level (e.g., a mean intensity level of image 100 or an intensity level determined through k-means clustering) may be identified as pixels within the pupil 104 (and segmented as black), and all other pixels may be identified as outside of the pupil 104 (and segmented as white).

Once the pixels have been segmented as either part of the pupil 104 (black) or not (white), the edge pixels 106 of the pupil 104 may be determined by applying various edge detection algorithms, such as the Canny edge detector, to the segmented image. Other algorithms may be used as well, such as the Deriche edge detector, differential edge detection, the Sobel operator, the Prewitt operator, or the Roberts cross operator, to name a few. By applying such an edge detection algorithm to the segmented pixels obtained through the Haar-like object recognition, the edge pixels 106 corresponding to the edge of the pupil 104 may be determined.

Figure 1C:
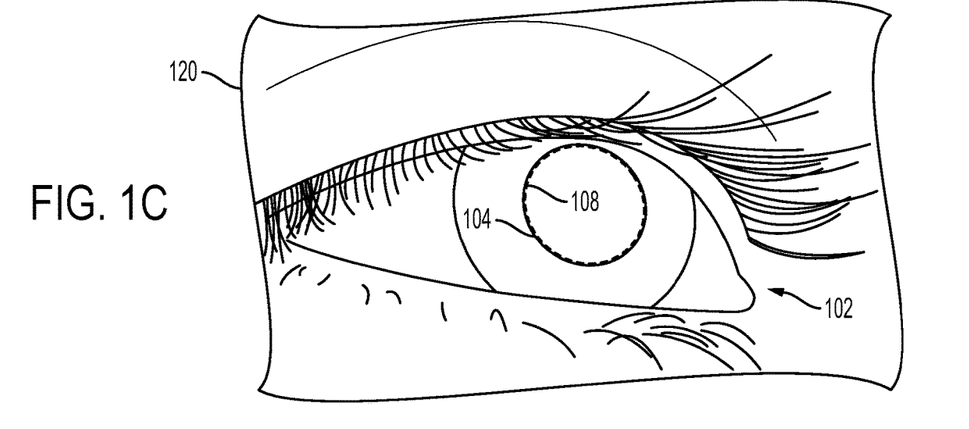
FIG. 1C is an image of an eye, according to an example embodiment.

As discussed above, based on the edge pixels 106, an ellipse may be fitted to the pupil 104. FIG. 1C depicts an image 120 of the eye 102 in which an ellipse 108 has been fitted to the edge pixels 106 and overlaid on the eye 102. The ellipse 108 may be determined through various curve-fitting algorithms, including algebraic curve-fitting or geometric curve-fitting. For example, a Monte Carlo method or a least squares method may be used, among others.

When fitting the ellipse 108 to the edge pixels 106, the ellipse 108 may be fit to a subset of the edge pixels 106. The subset may include various proportions of the edge pixels 106 and may be selected deliberately or at random. For example, the subset of the edge pixels 106 may include five of the edge pixels 106 selected at random. In other examples, the subset of the edge pixels 106 may include more than five pixels.

The subset of the edge pixels 106 may be fitted to an ellipse represented by the following equation:

$$Ax^2+Bxy+Cy^2+Dx+Ey+F=0, \quad \text{Equation 1}$$

which may be rewritten as:

$$A'xy+B'y^2+C'x+D'y+E'=-x^2. \quad \text{Equation 2}$$

Accordingly, given five points in two-dimensional space (i.e., $(x_1, y_1)$, $(x_2, y_2)$, ..., and $(x_5, y_5)$), five elliptical equations may be formed having five unknown polynomial coefficients (i.e., A'-E' of Equation 2). Thus, an ellipse containing each of the five points may be obtained by solving the following matrix equation:

$$\begin{bmatrix} a & b & c & d & e \\ f & g & h & i & j \\ k & l & m & n & o \\ p & q & r & s & t \\ u & v & w & x & y \end{bmatrix}^T \begin{bmatrix} M_1 \\ M_2 \\ M_3 \\ M_4 \\ M_5 \end{bmatrix}^T = \begin{bmatrix} B_1 \\ B_2 \\ B_3 \\ B_4 \\ B_5 \end{bmatrix}^T, \quad \text{Equation 3}$$

where
$a=2x_1y_1$, $b=y_1^2$, $c=2x_1$, $d=2y_1$, $e=1$,
$f=2x_2y_2$, $g=y_2^2$, $h=2x_2$, $i=2y_2$, $j=1$,
$k=2x_3y_3$, $l=y_3^2$, $m=2x_3$, $n=2y_3$, $o=1$,
$p=2x_4y_4$, $q=y_4^2$, $r=2x_4$, $s=2y_4$, $t=1$,
$u=2x_5y_5$, $v=y_5^2$, $w=2x_5$, $x=2y_5$, $y=1$;
and where
$B_1=-x_1^2$,
$B_2=-x_2^2$,
$B_3=-x_3^2$,
$B_4=-x_4^2$, and
$B_5=-x_5^2$.

Solving Equation 3 for $M_{1-5}$ yields the polynomial coefficients of the quadratic elliptical equation of Equation 1, where $A=1$, $B=2M_1$, $C=M_2$, $D=2M_3$, $E=2M_4$, and $F=M_5$.

In order to solve for $M_{1-5}$, symbolic equations (or symbolic computation) may be used to reduce Equation 3 to a series of equations that only include basic operators, such as addition, subtraction, multiplication, and division. By only using basic operators, the five unknowns of Equation 2 may be solved for more quickly and more efficiently than would otherwise be possible. As an example, the following symbolic equations may be used to solve for $M_{1-5}$:

$$A_2 = alri - alsh - amqi + amsg + anqh - anrg + kqci -$$
$$kqdh - krbi + krdg + ksbh - kscg - lpci + lpdh - lrdf + lscf +$$
$$mpbi - mpdg + mqdf - msbf - npbh + npcg - nqcf + nrbf,$$

$$A_3 = -alh + amg + kbh - kcg + lcf - mbf,$$

$$A_6 = ag - bf,$$

$$A_8 = g - \frac{bf}{a},$$

$$A_9 = q - \frac{pb}{a},$$

$$A_{10} = l - \frac{kb}{a},$$

$$A_{11} = v - \frac{bu}{a},$$

$$A_{12} = j - \frac{ef}{a},$$

-continued $$A_{13} = h - \frac{cf}{a},$$

$$A_7 = r - \frac{A_9 A_{13}}{A_8} - \frac{pc}{a},$$

$$A_5 = w - \frac{A_{11} A_{13}}{A_8} - \frac{uc}{a},$$

$$A_{14} = i - \frac{df}{a},$$

$$A_{18} = n - \frac{A_{10} A_{14}}{A_8} - \frac{kd}{a},$$

$$A_4 = x - \frac{A_{11} A_{14}}{A_8} - \frac{A_6 A_{18} A_5}{A_3} - \frac{ud}{a},$$

$$A_{19} = aA_8,$$

$$A_{15} = -\frac{k}{a} + \frac{fA_{10}}{A_{19}},$$

$$A_{16} = -\frac{bA_{13}}{A_{19}} + \frac{c}{a},$$

$$A_{17} = -\frac{A_{15} A_6 A_7}{A_3} - \frac{p}{a} + \frac{fA_9}{A_{19}},$$

$$A_{20} = o - \frac{A_{12} A_{10}}{A_8} - \frac{ke}{a},$$

$$A_{21} = t - \frac{A_{12} A_9}{A_8} - \frac{A_6 A_{20} A_7}{A_3} - \frac{pe}{a},$$

$$A_{22} = -\frac{A_6 A_{16} A_{18}}{A_3} - \frac{bA_{14}}{A_{19}} + \frac{d}{a},$$

$$A_{23} = -\frac{A_{15} A_6 A_5}{A_3} - \frac{A_{17} A_4 A_3}{A_2} - \frac{u}{a} + \frac{fA_{11}}{A_{19}},$$

$$A_{24} = -\frac{A_6 A_{16} A_{20}}{A_3} - \frac{A_{22} A_{21} A_3}{A_2} - \frac{bA_{12}}{A_{19}} + \frac{e}{a},$$

$$A_{25} = \frac{A_{10} A_6 A_7}{A_8 A_3} - \frac{A_9}{A_8},$$

$$A_{26} = -\frac{A_{10} A_6 A_5}{A_8 A_3} - \frac{A_{11}}{A_8} - \frac{A_{25} A_4 A_3}{A_2},$$

$$A_{27} = -\frac{A_{13} A_6 A_{18}}{A_8 A_3} + \frac{A_{14}}{A_8},$$

$$A_{28} = \frac{A_{12}}{A_8} - \frac{A_{27} A_{21} A_3}{A_2} - \frac{A_{13} A_6 A_{20}}{A_8 A_3},$$

$$A_{29} = -\frac{A_6 A_{18} A_{21}}{A_2} + \frac{A_6 A_{20}}{A_3}, \text{ and}$$

$$A_1 = y - \frac{A_{12} A_{11}}{A_8} + \frac{A_6\left(-o + \frac{A_{12} A_{10}}{A_8} + \frac{ke}{a}\right)\left(-w + \frac{A_{11} A_{13}}{A_8} + \frac{uc}{a}\right)}{alh - amg - kbh + kcg - lcf + mbf} +$$

$$\left(t - \frac{A_{12} A_9}{A_8} + \frac{A_6\left(-o + \frac{A_{12} A_{10}}{A_8} + \frac{ke}{a}\right)\left(-r + \frac{A_9 A_{13}}{A_8} + \frac{pc}{a}\right)}{alh - amg - kbh + kcg - lcf + mbf} - \frac{pe}{a}\right) \times$$

$$\left(x - \frac{A_{11} A_{14}}{A_8} + \frac{A_6\left(-n + \frac{A_{10} A_{14}}{A_8} + \frac{kd}{a}\right)\left(-w + \frac{A_{11} A_{13}}{A_8} + \frac{uc}{a}\right)}{alh - amg - kbh + kcg - lcf + mbf} - \frac{ud}{a}\right) \times$$

$$\frac{alh - amg - kbh + kcg - lcf + mbf}{A_2} - \frac{ue}{a};$$

such that $$M_1 = B_1\left(-\frac{A_{15} A_6 A_{16}}{A_3} - \frac{A_{17} A_{22} A_3}{A_2} - \frac{A_{23} A_{24}}{A_1} + \frac{1}{a} + \frac{bf}{a^2 A_8}\right) +$$
$$B_2\left(\frac{A_{10} A_6 A_{16}}{A_8 A_3} - \frac{A_{25} A_{22} A_3}{A_2} - \frac{A_{26} A_{24}}{A_1} - \frac{b}{A_{19}}\right) +$$

-continued $$B_3\left(-\frac{A_6A_{16}}{A_3} + \frac{A_6A_7A_{22}}{A_2} - \left(\frac{A_6A_7A_4}{A_2} - \frac{A_6A_5}{A_3}\right)\frac{A_{24}}{A_1}\right) +$$
$$B_4\left(-\frac{A_{22}A_3}{A_2} + \frac{A_4A_{24}A_3}{A_1A_2}\right) - B_5\frac{A_{24}}{A_1},$$

$$M_2 = B_1\left(-\frac{A_{27}A_{17}A_3}{A_2} - \frac{A_{28}A_{23}}{A_1} - \frac{A_{13}A_{15}A_6}{A_8A_3} - \frac{f}{A_{19}}\right) +$$
$$B_2\left(\frac{A_{10}A_{13}A_6}{A_8^2A_3} - \frac{A_{25}A_{27}A_3}{A_2} - \frac{A_{28}A_{26}}{A_1} + \frac{1}{A_8}\right) +$$
$$B_3\left(\frac{A_6A_{27}A_7}{A_2} - \left(\frac{A_6A_7A_4}{A_2} - \frac{A_6A_5}{A_3}\right)\frac{A_{28}}{A_1} - \frac{A_{13}A_6}{A_8A_3}\right) +$$
$$B_4\left(-\frac{A_{27}A_3}{A_2} + \frac{A_{28}A_4A_3}{A_1A_2}\right) - B_5\frac{A_{28}}{A_1},$$

$$M_3 = B_1\left(\frac{A_{15}A_6}{A_3} - \frac{A_6A_{18}A_{17}}{A_2} - \frac{A_{29}A_{23}}{A_1}\right) +$$
$$B_2\left(-\frac{A_{10}A_6}{A_8A_3} - \frac{A_6A_{25}A_{18}}{A_2} - \frac{A_{29}A_{26}}{A_1}\right) +$$
$$B_3\left(\frac{A_6^2A_{18}A_7}{A_3A_2} + \frac{A_6}{A_3} - \left(\frac{A_6A_7A_4}{A_2} - \frac{A_6A_5}{A_3}\right)\frac{A_{29}}{A_1}\right) +$$
$$B_4\left(-\frac{A_6A_{18}}{A_2} + \frac{A_{29}A_4A_3}{A_1A_2}\right) - B_5\frac{A_{29}}{A_1},$$

$$M_4 = B_1\left(\frac{A_{17}A_3}{A_2} - \frac{A_{21}A_{23}A_3}{A_1A_2}\right) + B_2\left(\frac{A_{25}A_3}{A_2} - \frac{A_{26}A_{21}A_3}{A_1A_2}\right) +$$
$$B_3\left(-\frac{A_6A_7}{A_2} - \left(\frac{A_6A_7A_4}{A_2} - \frac{A_6A_5}{A_3}\right)\frac{A_{21}A_3}{A_1A_2}\right) +$$
$$B_4\left(\frac{A_{21}A_4A_3^2}{A_1A_2^2} + \frac{A_3}{A_2}\right) - B_5\frac{A_{21}A_3}{A_1A_2}, \text{ and}$$

$$M_5 = B_1\frac{A_{23}}{A_1} + B_2\frac{A_{26}}{A_1} + B_3\left(\frac{A_6A_7A_4}{A_2} - \frac{A_6A_5}{A_3}\right)\frac{1}{A_1} - B_4\frac{A_4A_3}{A_1A_2} + B_5\frac{1}{A_1}.$$

And, as discussed above, Equation 1 represents a quadratic equation of an ellipse containing each of the five points ($x_{1-5}$, $y_{1-5}$), where A=1, B=2$M_1$, C=$M_2$, D=2$M_3$, E=2$M_4$, and F=$M_5$.

Further, from the quadratic equation of the ellipse, various parameters of the ellipse may be determined. The parameters may include, for example, a center, a major axis, a minor axis, and an angle of rotation of the ellipse. In particular, using the solved variables $M_{1-5}$ from Equation 3, the center coordinates of the ellipse may be determined using the following equations:

$$x_{center} = \frac{M_2M_3 - M_1M_4}{M_1^2 - M_2}, \text{ and } y_{center} = \frac{M_4 - M_1M_3}{M_1^2 - M_2}.$$

Additionally, the major and minor axes may be determined using the following equations:

$$axis_1 = \sqrt{\frac{\frac{2}{M_1^2 - M_2}(M_4^2 + M_2M_3^2 + M_5M_1^2 - 2M_1M_3M_4 - M_3M_5)}{(M_2 - 1)\sqrt{1 + \frac{4M_1^2}{(1-M_2)^2}} - (M_2 + 1)}}, \text{ and}$$

$$axis_2 = \sqrt{\frac{\frac{2}{M_1^2 - M_2}(M_4^2 + M_2M_3^2 + M_5M_1^2 - 2M_1M_3M_4 - M_3M_5)}{-(M_2 - 1)\sqrt{1 + \frac{4M_1^2}{(1-M_2)^2}} - (M_2 + 1)}}.$$

Here, the larger of $axis_1$ and $axis_2$ represents the length of the major axis of the ellipse, while the smaller represents the length of the minor axis. The determined lengths are represented as unit length, such that the determined lengths will share the same units as the coordinates of the five points ($x_{1-5}$, $y_{1-5}$). Thus, if the coordinates are represented as millimeters, for example, then the determined lengths of $axis_1$ and $axis_2$ will also be in millimeters.

Further, based on the determined polynomial coefficients of the ellipse equation, an angle of rotation of the ellipse may be determined. The angle of rotation represents an extent of rotation of the major axis of the ellipse around the center point of the ellipse. For example, an ellipse having its major axis aligned with the x-axis may have an angle of rotation of zero radians (or degrees), while an ellipse having its major axis aligned with the y-axis may have an angle of rotation of $$\frac{\pi}{2}$$

radians (or 90 degrees). In particular, if $axis_1$ is the major axis (i.e., if $axis_1$ is larger than $axis_2$), then the degree of rotation may be determined by the following equation:

$$\varphi = -\frac{1}{2}\arctan\left(\frac{2M_1}{M_2 - 1}\right).$$

Alternatively, if $axis_2$ is the major axis (i.e., if $axis_2$ is larger than $axis_1$), then the degree of rotation may be shifted by $$\frac{\pi}{2}$$

radians such that:

$$\varphi = \frac{\pi}{2} - \frac{1}{2}\arctan\left(\frac{2M_1}{M_2 - 1}\right).$$

Similarly, given various parameters of the ellipse (e.g., the center, major axis, minor axis, and angle of rotation), the polynomial coefficients of the quadratic ellipse equation may be determined. In particular, the polynomial coefficients A-F of Equation 1 may be determined by the following equations:

$$A = 1, B = \frac{Z_2}{Z_1}, C = \frac{Z_3}{Z_1}, D = \frac{Z_4}{Z_1}, E = \frac{Z_5}{Z_1}, \text{ and } F = \frac{Z_6}{Z_1},$$

where $$Z_1 = (axis_{minor}\cos\varphi)^2 + (axis_{major}\sin\varphi)^2$$
$$Z_2 = -2\cos\varphi\sin\varphi(axis_{major}^2 - axis_{minor}^2),$$
$$Z_3 = (axis_{minor}\sin\varphi)^2 + (axis_{major}\cos\varphi)^2,$$
$$Z_4 = -2x_{center}Z_1 - y_{center}Z_2,$$
$$Z_5 = -2y_{center}Z_3 - x_{center}Z_2, \text{ and}$$

-continued $$Z_6 = -(\text{axis}_{major}\text{axis}_{minor})^2 + x_{center}^2 Z_1 + x_{center}y_{center}Z_2 + y_{center}^2 Z_3.$$

In some embodiments, an ellipse fitted to one subset of the edge pixels 106 may better align with the pupil 104 than an ellipse fitted to a different subset of the edge pixels 106 (e.g., due to asymmetries and imperfections in the overall shape of the edge pixels 106). Accordingly, it may be desirable to select multiple subsets of the edge pixels 106 in which each subset is unique from the other subsets by at least one pixel, and fit an ellipse to each unique subset. In an example embodiment, a confidence value may be assigned to each of the fitted ellipses. In such scenarios, the fitted ellipse having the highest confidence value may be selected as a best fit ellipse.

Figure 1D:
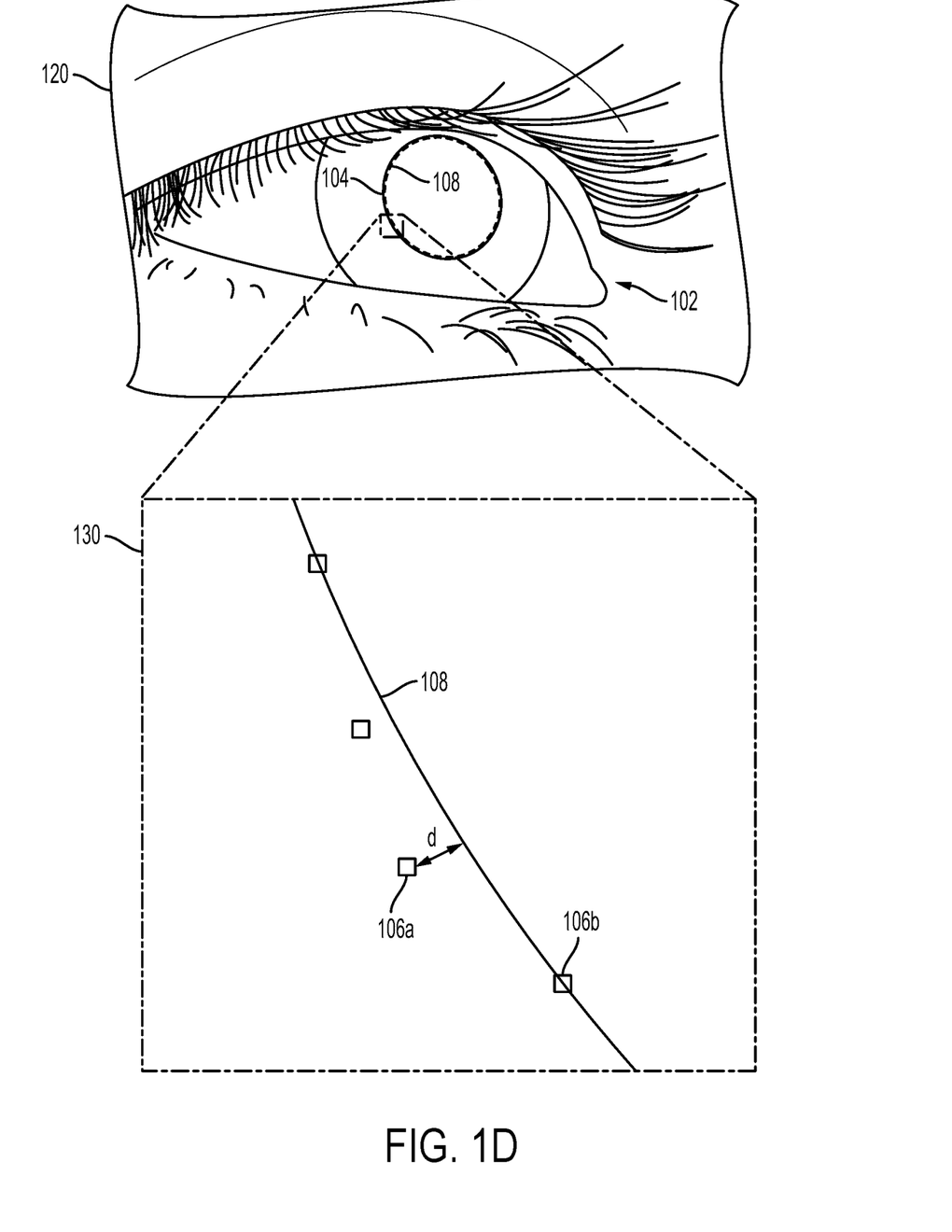
FIG. 1D is an image of an eye with a portion of the image enlarged, according to an example embodiment.

In some examples, the confidence value of a fitted ellipse may be based on a distance between each of the edge pixels 106 and a nearest point on the fitted ellipse. For instance, FIG. 1D illustrates an enlarged portion 130 of image 120 for determining the confidence value of fitted ellipse 108. The enlarged portion 130 illustrates a close-up view of a portion of fitted ellipse 108 and the nearby edge pixels 106. For simplicity and to distinguish fitted ellipse 108 from the edge pixels 106, fitted ellipse 108 is illustrated as a smooth line rather than a series of pixels. For further simplicity, one or more of the edge pixels 106 may not be included in the enlarged portion 130 of image 120 as illustrated.

As shown, each of the edge pixels 106 may be offset from fitted ellipse 108 by a respective distance. For example, edge pixel 106a is offset from fitted ellipse 108 by a distance d, while edge pixel 106b falls directly on fitted ellipse 108. In practice, the confidence value may be based on a number of edge pixels 106 that are located within a threshold distance of fitted ellipse 108. For instance, the confidence value may be based on how many edge pixels 106 are located within one pixel of fitted ellipse 108. Further, the confidence value may be represented by a percentage or fraction of edge pixels 106 that are located within the threshold distance. For example, a fitted ellipse having 90% of the edge pixels located within one pixel of the fitted ellipse may have a confidence value of 90% (or 0.9).

In some examples, the confidence value may be additionally or alternatively based on various determined parameter values of the fitted ellipse. As described above, given a quadratic equation of a fitted ellipse, the major and minor axes, as well as the angle of rotation of the fitted ellipse may be determined. Thus, the confidence value for a fitted ellipse may be based on a determined length of the major axis, a determined length of the minor axis, a ratio of the lengths of the major and minor axes, and/or an angle of rotation of the fitted ellipse. For example, in some embodiments, each of these parameters may be compared to an expected value. The expected value may be based on previous measurements and/or typical parametric values associated with a pupil of an eye. The confidence value may then be based on how significantly each parameter varies from the expected value of that parameter.

Figure 2A:
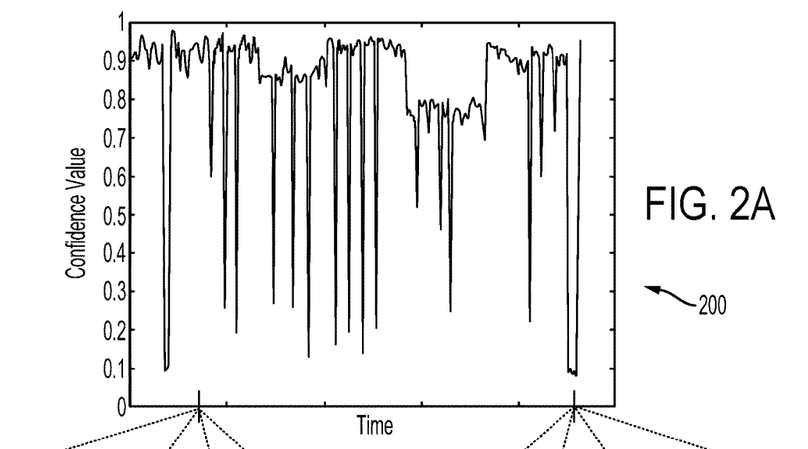
FIG. 2A is a plot of confidence values over time, according to an example embodiment.
Figure 2B:
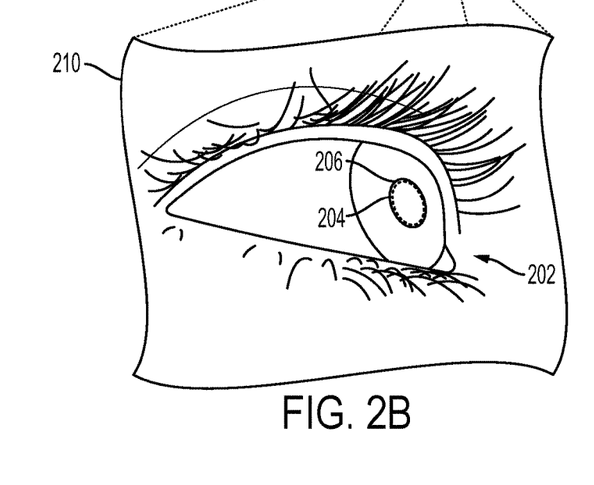
FIG. 2B is an image of an eye, according to an example embodiment.
Figure 2C:
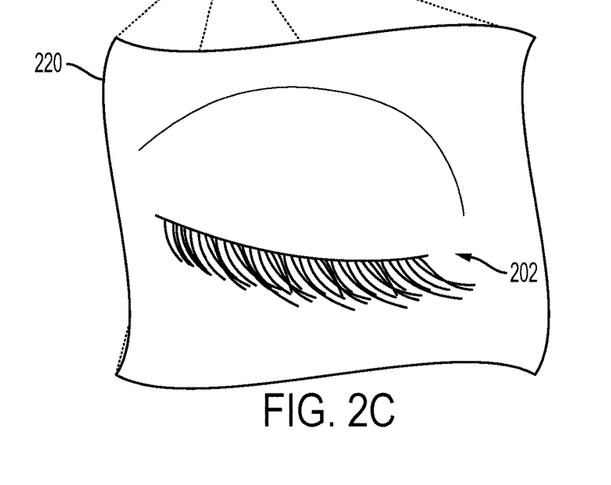
FIG. 2C is an image of an eyelid, according to an example embodiment.

FIG. 2A shows an example plot 200 of the confidence values of fitted ellipses for a series of images of an eye captured over time. The confidence value may vary based on reduced visibility of the pupil, which may be caused by various orientations of the eye and/or an openness of the eye (e.g., whether the eye is partially or completely closed due to winking or blinking). For example, FIG. 2B shows an image 210 of a fully open eye 202 having a fitted ellipse 204 overlaid on the eye 202. As shown, the fitted ellipse 204 is closely aligned with the edge of the pupil 206, and this is reflected by the fitted ellipse having a confidence value over 90%. On the other hand, FIG. 2C shows an image 220 of the eye 202 with its eyelid fully closed. Without a visible pupil, the confidence value of a fitted ellipse drops toward zero. Accordingly, in some examples, a series of images of an eye may be captured over time, and, based on a confidence value associated with a fitted ellipse for a pupil of each image, an openness of the eye at any given time may be determined. For example, a best fit ellipse having a confidence value of 50% or lower may be associated with a wink or a blink of the eye. Other examples are possible as well.

In some examples, rather than or in addition to fitting an ellipse to the pupil 104 based on the detected edge pixels 106, an ellipse may be fitted to the pupil 104 using a pixel intensity gradient method in which a best fit ellipse for the pupil 104 is determined based on a difference in pixel intensity between pixels located inside an ellipse and pixels located outside the ellipse. Such a method relies on the fact that the pixels corresponding to the pupil 104 are much darker (i.e., have a lower intensity) than other pixels in image 100.

In the pixel intensity gradient method, a number of ellipses may be generated (e.g., through a Monte Carlo method) and overlaid on the image 100 of the eye 102. For each ellipse, a pixel intensity gradient may be determined. The pixel intensity gradient may represent a difference in magnitude of pixel intensity between pixels of the image 100 that are enclosed by a respective ellipse and pixels of the image 100 that are not enclosed by the respective ellipse. For example, the pixel intensity gradient may be a difference in magnitude between an average pixel intensity of all pixels (or a subset of all pixels) enclosed by the ellipse and the average pixel intensity of all pixels (or a subset of all pixels) not enclosed by the ellipse. Other examples are possible as well.

Based on the determined pixel intensity gradients for each ellipse, a best fit ellipse may be determined. For instance the best fit ellipse may be identified as the ellipse having the largest pixel intensity gradient (i.e., the largest difference in pixel intensities between pixels located inside the ellipse and pixels located outside the ellipse).

Figure 3A:
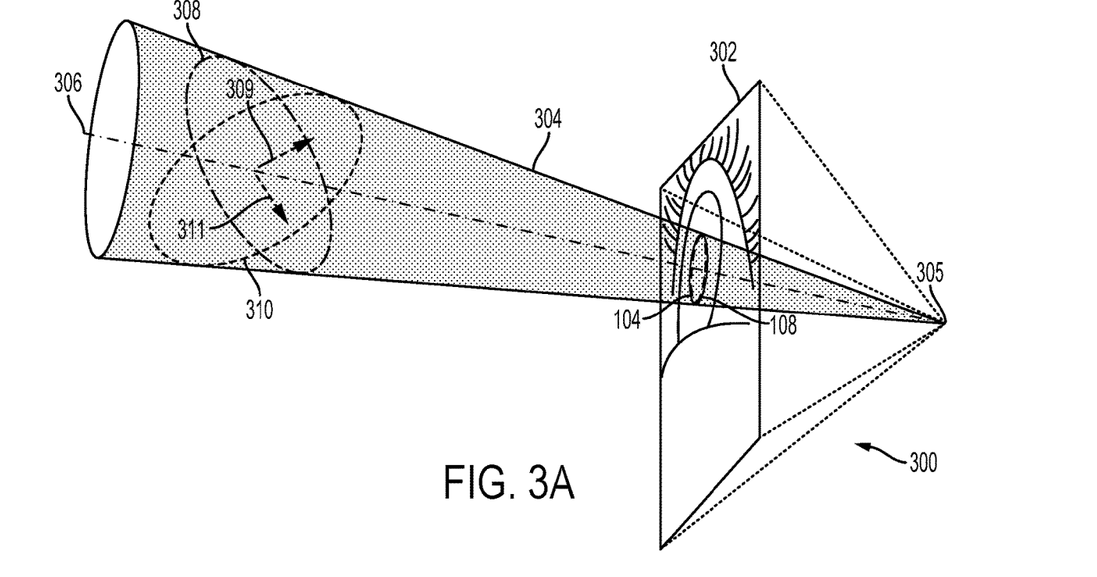
FIG. 3A illustrates a geometric projection based on an image of an eye, according to an example embodiment.

Referring next to FIG. 3A, a diagram 300 is shown for determining a circle corresponding with the pupil 104 based on a reverse geometric projection of the best fit ellipse 108. As discussed above, the pupil 104 may be approximated as a circle in 3D space, but may appear elliptical in a 2D image plane 302 of the 3D space where the pupil 104 is not perfectly orthogonal to the image plane 302. Thus, the circle that corresponds with the pupil may be determined by identifying a circle in 3D space that projects onto the best fit ellipse 108 of the pupil 104 in 2D space. Such a circle may be identified through reverse geometric projection.

When carrying out reverse geometric projection to determine the circles in three dimensions that project onto the best fit ellipse in two dimensions, it may be necessary to identify roots of one or more polynomial equations. In particular, it may be necessary to identify the roots of a third order polynomial equation. Conventional root-finding methods, such as the bisection method (also known as the interval halving method, the binary search method, or the dichotomy method), may involve identifying a subsection of the curve that includes a root and repeatedly bisecting the subsection surrounding the root until the bisection converges on the root. Such iterative processes, while robust, may be relatively slow and/or may consume relatively large amounts of computational resources when compared to other methods.

Accordingly, in some examples, performing reverse projection on the best fit ellipse may involve using symbolic equations (symbolic computation) to determine the roots of one or more polynomial equations. By using symbolic equations, a mathematical expression may be manipulated such that the roots of a polynomial equation may be computed by solving a series of equations including basic operators (addition, subtraction, multiplication, and division) and/or trigonometric functions. Such equations may be solved faster and in a more computationally efficient manner than using iterative methods, such as the bisection method.

Performing reverse geometric projection on an ellipse may identify two possible solutions for a circle that projects onto the ellipse. For example, for a given best fit ellipse based on an image of a pupil of an eye, there are two possible orientations (corresponding to two gaze directions of the eye) of the pupil that would result in the pupil aligning with the best fit ellipse in the image. However, only one of the two circles corresponds with the actual orientation of the pupil.

As depicted in FIG. 3A, in order to determine the circle that corresponds with the pupil 104, a cone 304 may be constructed that intersects the image plane 302 through the best fit ellipse 108 and has a vertex 305 located at the focal point of the camera used to capture the image of the eye. Circular cross sections of the cone 304 may represent the entire set of possible circles corresponding with the pupil 104. At this point, it may be ambiguous as to whether the best fit ellipse 108 corresponds with a pupil 104 that is large and far away, small and close, or something in between. Thus, an arbitrary radius of the pupil 104 may be chosen (e.g., 1 mm), which may be determined and/or quantified at a later point.

For a particular radius, the cone 304 may have one of two circular bases (depicted by circles 308 and 310), both of which share a center point that falls along a center axis 306 of the cone 304, and both of which project onto the best fit ellipse 108. However, only one of the circles 308 and 310 corresponds with a correct orientation of the pupil 104, as vectors normal to their respective surfaces (depicted by vectors 309 and 311) point in different directions. Specifically, vectors 309 and 311 have the same scalar components along two dimensions (e.g., the x- and y-dimensions) and different scalar components along a third dimension (e.g., the z-dimension).

In an example embodiment, to identify which of the circles 308 and 310 corresponds with the correct orientation of the pupil 104, a center point of the eyeball may be determined. Best fit ellipses from multiple (e.g., two or more) images of the eye 102 may be used to determine the center point of the eyeball. From each of the best fit ellipses, two possible circles may be obtained through reverse geometric projection as discussed above. As further discussed above, for each best fit ellipse, the two possible circle solutions share a center point, and their normal vectors have the same scalar components along two dimensions (e.g., the x- and y-dimensions). Thus, in a 2D space (i.e., the two dimensions in which the normal vectors share scalar components), the normal vectors of the two circles are equivalent to a single 2D vector.

Two-dimensional coordinates of the center point of the eyeball may be determined as an intersection of the 2D vectors for each of the best fit ellipses from the multiple images of the eye 102. Once the 2D coordinates of the center point are determined, the circle corresponding with the correct orientation of the pupil 104 may be identified based on its 3D normal vector pointing toward the 2D center point. This 3D normal vector corresponds to the gaze direction of the eye 102. The 3D normal vector of the other circle, by contrast, points away from the 2D center point. Thus, this circle does not correspond with the correct orientation of the pupil 104 and may be ignored.

Figure 3B:
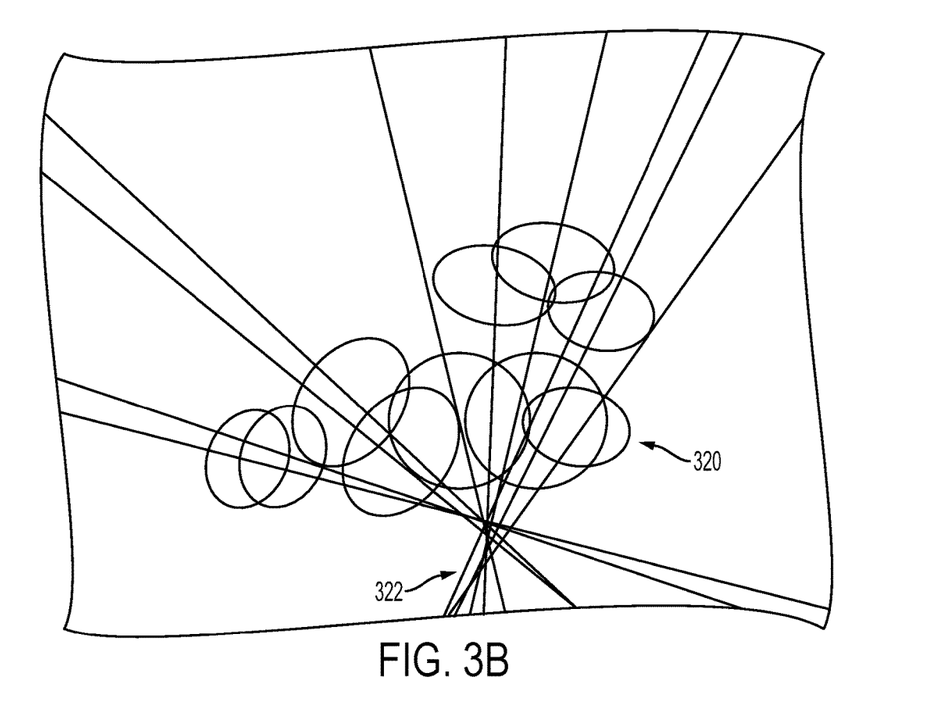
FIG. 3B illustrates a number of geometric projections based on images of an eye, according to an example embodiment.

By ignoring the circles corresponding with incorrect orientations of the pupil 104 and using only the circles corresponding with correct orientations of the pupil 104, a 3D center point of the eyeball may be determined based on an intersection of the 3D normal vectors of the circles. For example, FIG. 3B depicts a number of circles 320 identified through reverse geometric projection of various images of the eye 102 and their corresponding 3D normal vectors 322. The 3D vectors 322 may intersect at a single point in 3D space, and the coordinates of this point may correspond with 3D coordinates of the center point of the eyeball.

In some cases, as depicted in FIG. 3B, the 3D vectors 322 may converge at multiple intersection points in a general area rather than intersecting at a single point due, for example, to inaccuracies in the best fit ellipses, inaccuracies in the reverse geometric projections, or asymmetries of the eyeball, among other possibilities. To account for this, the coordinates of the center point of the eyeball may be chosen as a point that minimizes a variance along one or more directions of all the intersections of the 3D vectors. Other ways to determine the center point of the eyeball are possible as well, such as by averaging the intersection points or using a least-squares method to determine a point closest to all of the 3D vectors.

In some examples, more or fewer circles 320 and their corresponding normal vectors 322 than those depicted in FIG. 3B may be identified for purposes of determining the center point of the eyeball. For example, as few as two circles 320 and their normal vectors 322 may be identified. However, identifying more circles 320 and their normal vectors 322 may improve the accuracy of the determined center point of the eyeball.

As discussed above, the images of the eye 102 may be captured by a camera of an HMD. In some cases, an HMD may move relative to a wearer's eye (e.g., due to a nosepiece sliding down the bridge of the wearer's nose, due to the wearer adjusting the HMD, etc.). Thus, it may be desirable to occasionally update the determined center point of the eyeball by carrying out some or all of the methods described above. For example, the center point of the eyeball may be determined once every second or once every ten seconds. Other examples are possible as well. Based on each updated center point of the eyeball, a movement of the HMD relative to the wearer's head over time may be determined by calculating the change over time in the center point coordinates. For an HMD mounted on a wearer's nose, for example, the movement of the HMD over time may correspond with a profile shape of the wearer's nose such that the profile shape of the wearer's nose may be determined by repeatedly measuring the center point of the eyeball.

With the center point of the eyeball known, the center point may be used to determine a gaze direction of the eye and a radius of its pupil for any given image of the eye. Referring back to FIGS. 1A-C and 3A, for example, the image 100 may be used to identify two circles 308 and 310 in 3D space that project onto the best fit ellipse 108 of the pupil 104 in 2D space. However, only one of the normal vectors 309 and 311 of the two circles 308 and 310 may point toward the known center point of the eyeball. The normal vector that points toward the center point may be identified as the gaze direction of the eye 102.

Further, once the vector corresponding to the gaze direction is determined, the radius of the pupil 104 may be determined by minimizing an angle between the gaze vector and a vector that connects the center point of the eyeball to the center point of the circle. As discussed above with reference to FIG. 3A, the center point of the circle falls along the center axis 305 of the cone 304. Moving the center point of the circle along the axis 305 alters the radius of the circle based on the varying radius of the cone 304 along the axis 305. Thus, the radius of the pupil 104 may be determined by choosing a center point of the circle along the axis 305 that minimizes the angle between the gaze vector and the vector that connects the center point of the eyeball to the center point of the circle, and by determining the radius of the circle for that center point.

Figure 4A:
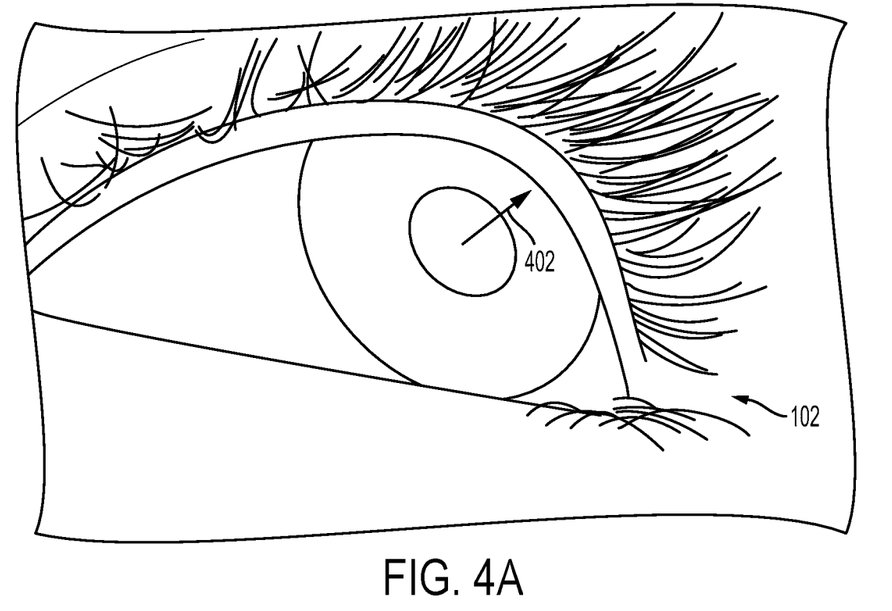
FIG. 4A is an image of an eye, according to an example embodiment.
Figure 4B:
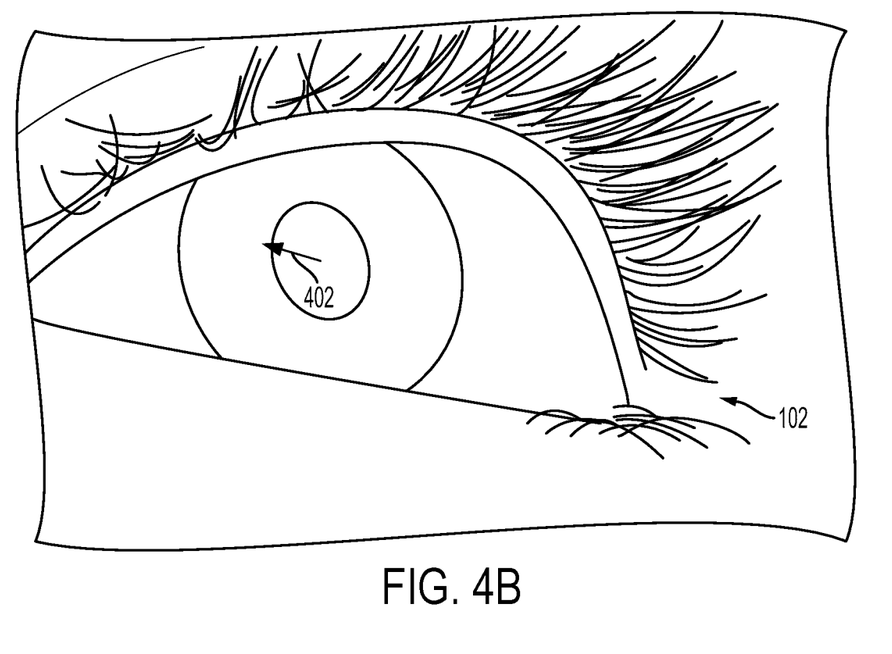
FIG. 4B is an image of an eye, according to an example embodiment.

FIGS. 4A and 4B illustrate an application of the methods described above to determine a gaze vector 402 for images of the eye 102 in different orientations. As illustrated, as the orientation of the eye 102 changes from FIG. 4A to 4B, so does the direction of the determined gaze vector 402. While the gaze direction is determined in camera space (i.e., in a coordinate system defined by the captured image(s) of the eye 102), the gaze direction may be converted to world space based on a known or otherwise determined orientation of the camera relative to the eye 102. For example, based on the orientation of the camera, a rotation matrix may be applied to the gaze vector to convert the gaze vector to world space.

Figure 5:
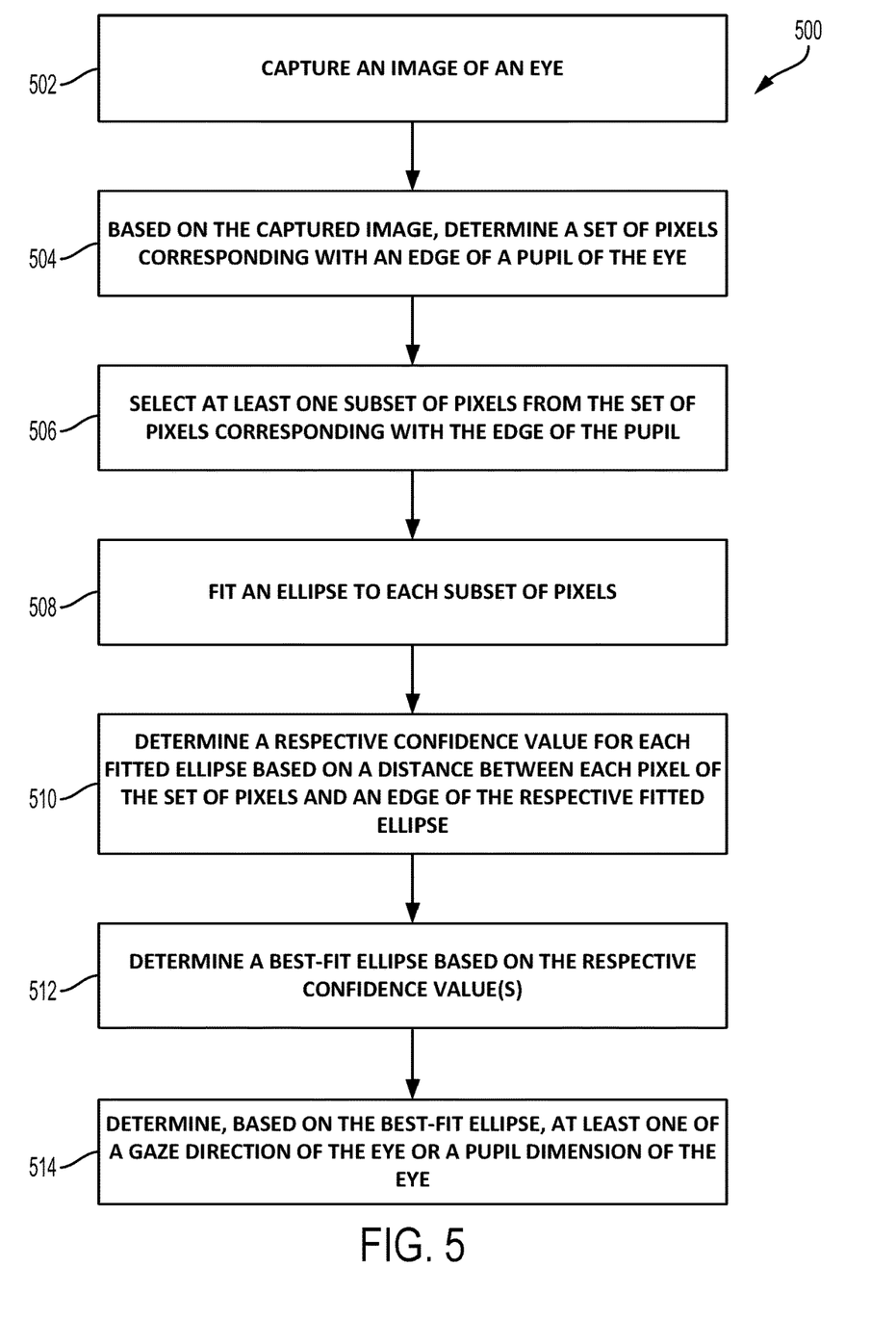
FIG. 5 is a flowchart of a method, according to an example embodiment.

FIG. 5 is a flowchart of a method 500 for determining a gaze direction and/or a pupil dimension of an eye, according to an example embodiment. Those skilled in the art will understand that the flowcharts described herein illustrate functionality and operation of certain implementations of example embodiments. In this regard, each block of the flowcharts can represent a module, a segment, or a portion of program code, which includes one or more instructions executable by a processor for implementing specific logical functions or steps in the process. The program code can be stored on any type of computer readable medium, for example, such as a storage device including a disk or hard drive. In addition, each block can represent circuitry that is wired to perform the specific logical functions in the process. Alternative implementations are included within the scope of the example embodiments of the present application in which functions can be executed out of order from that shown or discussed, including substantially concurrent or in reverse order, depending on the functionality involved, as would be understood by those reasonably skilled in the art.

The method 500 begins at block 502, which includes capturing an image of an eye. At block 504, the method 500 includes, based on the captured image, determining a set of pixels corresponding with an edge of a pupil of the eye. At block 506, the method 500 includes selecting at least one subset of pixels from the set of pixels corresponding with the edge of the pupil. At block 508, the method 500 includes fitting an ellipse to each subset of pixels. At block 510, the method 500 includes determining a respective confidence value for each fitted ellipse based on a distance between each pixel of the set of pixels and an edge of the respective fitted ellipse. At block 512, the method 500 includes determining a best-fit ellipse based on the respective confidence value(s). And at block 514, the method 500 includes determining, based on the best-fit ellipse, at least one of a gaze direction of the eye or a pupil dimension of the eye.

Figure 6:
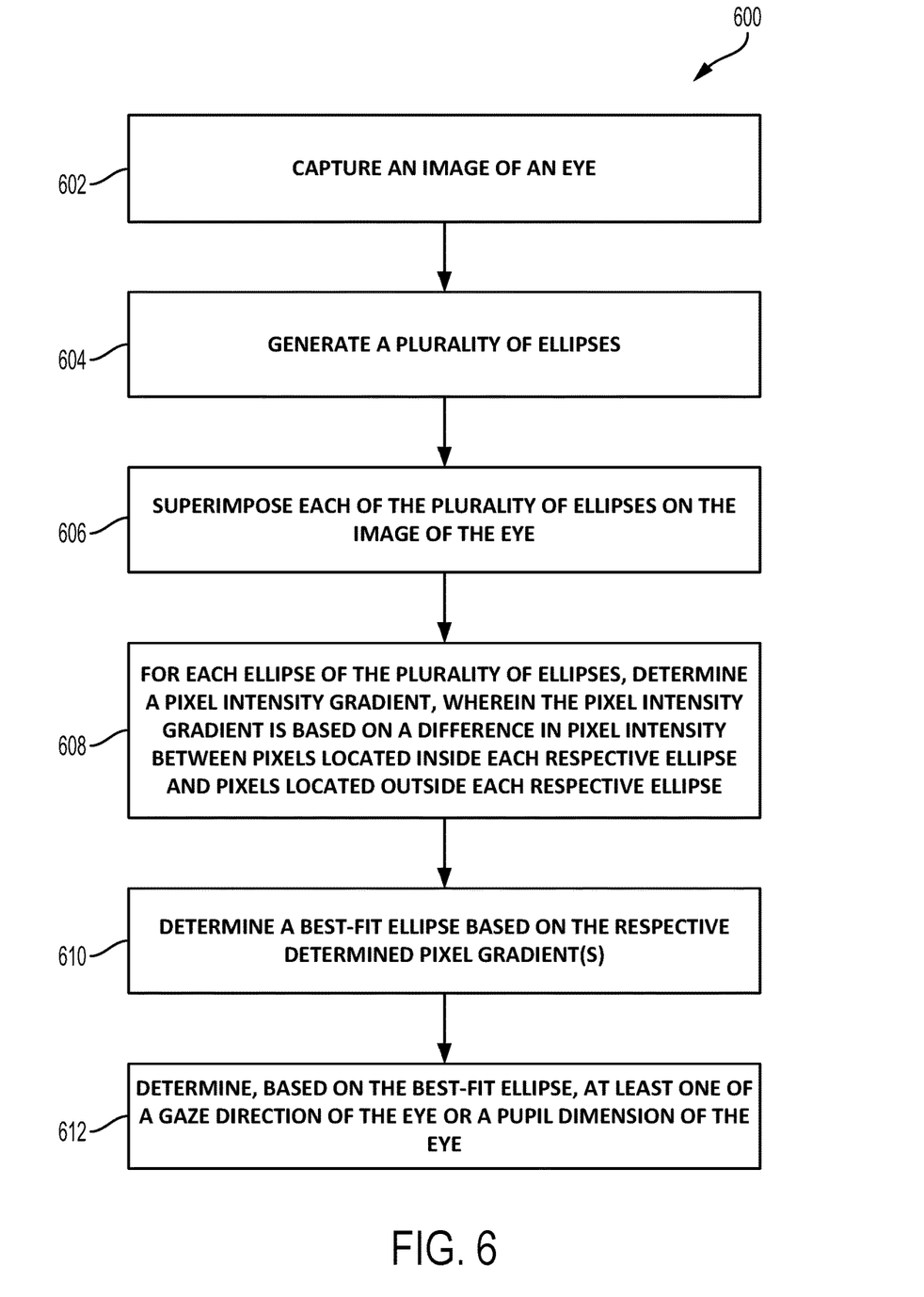
FIG. 6 is a flowchart of a method, according to an example embodiment.

FIG. 6 is next another flowchart of a method 600 for determining a gaze direction and/or a pupil dimension of an eye, according to an example embodiment. The method 600 begins at block 602, which includes capturing an image of an eye. At block 604, the method 600 includes generating a plurality of ellipses. At block 606, the method 600 includes superimposing each of the plurality of ellipses on the image of the eye. At block 608, the method 600 includes, for each ellipse of the plurality of ellipses, determining a pixel intensity gradient, wherein the pixel intensity gradient is based on a difference in pixel intensity between pixels located inside each respective ellipse and pixels located outside each respective ellipse. At block 610, the method 600 includes determining a best-fit ellipse based on the respective determined pixel gradient(s). And at block 612, the method 600 includes determining, based on the best-fit ellipse, at least one of a gaze direction of the eye or a pupil dimension of the eye.

Figure 7:
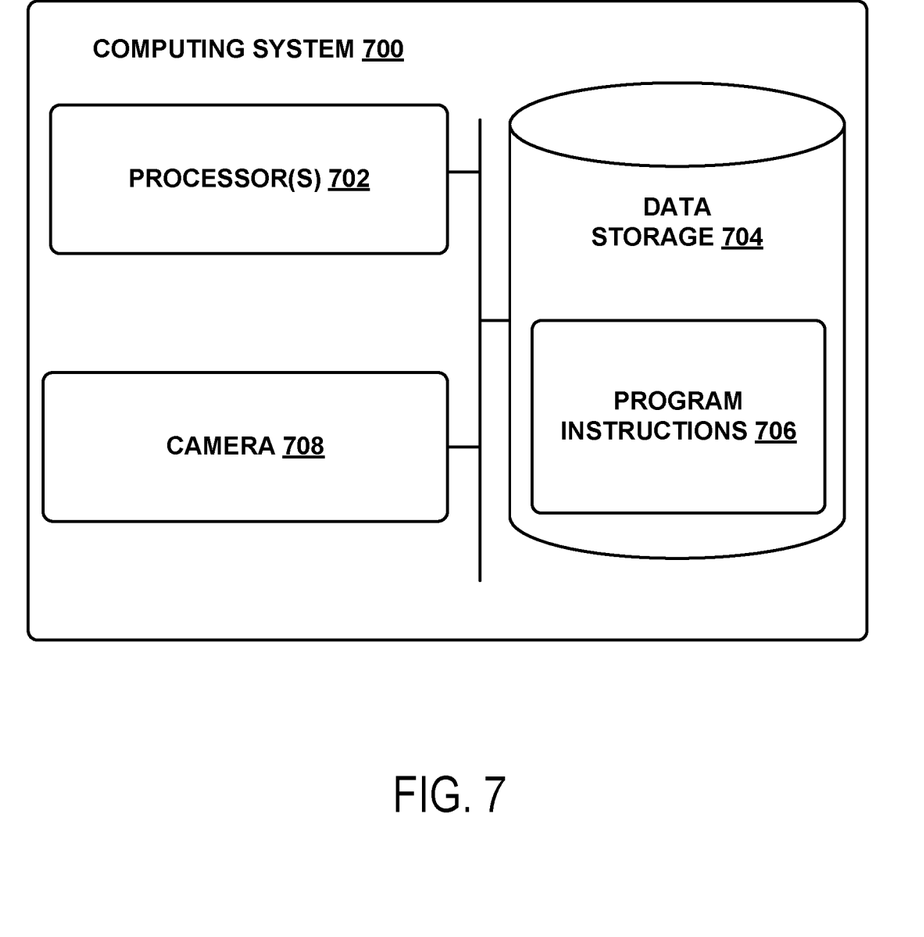
FIG. 7 is a block diagram of a computing system, according to an example embodiment.

FIG. 7 is a simplified block diagram of a computing system 700 that could be configured to carry out operations such as those described above. The computing device 700 can include one or more processors 702, data storage 704, program instructions 706, and a camera 708, all of which can be coupled by a system bus or a similar mechanism. The one or more processors 702 can include one or more central processing units (CPUs), such as one or more general purpose processors and/or one or more dedicated processors (e.g., application specific integrated circuits (ASICs) or digital signal processors (DSPs), etc.).

The data storage 704 can include or take the form of one or more computer-readable storage media that can be read or accessed by at least one of the one or more processors 702. The one or more computer-readable storage media can include volatile and/or non-volatile storage components, such as optical, magnetic, organic, or other memory or disc storage, which can be integrated in whole or in part with at least one of the one or more processors 702. In some embodiments, the data storage 704 can be implemented using a single physical device (e.g., one optical, magnetic, organic, or other memory or disc storage unit), while in other embodiments, the data storage 704 can be implemented using two or more physical devices.

The one or more processors 702 can be configured to execute computer-readable program instructions 706 that are stored in the data storage 704 and are executable to provide at least part of the functionality described herein. For instance, the one or more processors 702 can be configured to execute computer-readable program instructions 706 that are stored in the data storage 704, thereby causing performance of a set of functions including (i) causing the camera 708 to capture an image of an eye; (ii) based on the image, determining a set of pixels corresponding with an edge of a pupil of the eye; (iii) selecting at least one subset of pixels from the set of pixels corresponding with the edge of the pupil; (iv) fitting an ellipse to each subset of pixels; (v) determining a respective confidence value for each fitted ellipse based on a distance between each pixel of the set of pixels and an edge of the respective fitted ellipse; (vi) determining a best-fit ellipse based on the respective confidence value(s); and (vii) determining, based on the best-fit ellipse for the pupil of the eye, at least one of a gaze direction of the eye or a pupil dimension of the eye.

Additionally or alternatively, the one or more processors 702 can be configured to execute computer-readable program instructions 706 that are stored in the data storage 704, thereby causing performance of a set of functions including (i) causing the camera 708 to capture an image of an eye; (ii) generating a plurality of ellipses; (iii) superimposing each ellipse of the plurality of ellipses on the image of the eye;

(iv) for each ellipse of the plurality of ellipses, determining a pixel intensity gradient, wherein the pixel intensity gradient is based on a difference in pixel intensity between pixels located inside each respective ellipse and pixels located outside each respective ellipse; (v) determining a best-fit ellipse based on the respective determined pixel gradient(s); and (vii) determining, based on the best-fit ellipse, at least one of a gaze direction of the eye or a pupil dimension of the eye.

III. CONCLUSION

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

What is claimed is:

1. A method comprising:
    capturing an image of an eye;
    determining a best-fit ellipse with respect to a pupil of the eye using an edge detection method, wherein the edge detection method comprises:
        based on the image, determining a set of pixels corresponding with an edge of the pupil;
        selecting at least one subset of pixels from the set of pixels corresponding with the edge of the pupil;
        fitting an ellipse to each subset of pixels;
        determining a respective confidence value for each fitted ellipse based on a distance between each pixel of the set of pixels and an edge of the respective fitted ellipse; and
        determining the best-fit ellipse based on the respective confidence value(s); and
    determining, based on the best-fit ellipse, at least one of a gaze direction of the eye or a pupil dimension of the eye.

2. The method of claim 1, wherein determining the gaze direction of the eye comprises:
    based on the best-fit ellipse for the pupil of the eye, determining an orientation of the pupil using projective geometry; and
    based on the determined orientation of the pupil, determining the gaze direction of the eye.

3. The method of claim 2, further comprising:
    determining coordinates of a center point of the eye, wherein determining the coordinates comprises:
    capturing a plurality of images of the eye;
    for each image of the plurality of images, determining the best-fit ellipse for the pupil of the eye;
    for each of the determined best-fit ellipses, determining two circles in three-dimensional space that each project onto a respective best-fit ellipse in two-dimensional space, wherein the two circles have the same center point and radius, and wherein vectors normal to the two circles have the same scalar components along two dimensions and different scalar components along a third dimension;
    based on the two circles having the same scalar components along the two dimensions, determining coordinates of the center point of the eye for the two dimensions; and
    based on the vectors normal to the circles, determining a coordinate of the center point of the eye for the third dimension, wherein the coordinate for the third dimension is an intersection point of the vectors along the third dimension.

4. The method of claim 3, wherein determining the two circles in three-dimensional space that each project onto the respective best-fit ellipse in two-dimensional space comprises using symbolic equations to determine the two circles.

5. The method of claim 3, wherein determining the gaze direction of the eye comprises:
    for at least one of the best-fit ellipses, determining that one of the two determined circles corresponds with the pupil of the eye based on its normal vector pointing toward the center point of the eye; and
    determining the gaze direction of the eye based on the normal vector pointing toward the center point of the eye.

6. The method of claim 5, wherein determining, based on the best-fit ellipse for the pupil of the eye, at least one of the gaze direction of the eye or the pupil dimension of the eye comprises determining a radius of the pupil, and wherein determining the radius of the pupil comprises:
    for the one of the two circles corresponding with the pupil, determining a radius of the circle that minimizes an angle between the gaze direction and a vector directed from the center point of the eye to the center point of the circle.

7. The method of claim 3, wherein capturing the plurality of images of the eye comprises capturing the plurality of images of the eye using a head-mountable device (HMD), and wherein the method further comprises:
    based on the determined coordinates of the center point of the eye, determining a change in position over time of the HMD with respect to the eye.

8. The method of claim 1, wherein determining the respective confidence value for each fitted ellipse based on the distance between each pixel of the set of pixels and the edge of the respective fitted ellipse comprises:
    for each pixel of the set of pixels, determining a number of pixels between each pixel of the set of pixels and the edge of the respective fitted ellipse; and
    determining the respective confidence value based on the determined number of pixels between each pixel of the set of pixels and the edge of the respective fitted ellipse.

9. The method of claim 1, further comprising:
    determining whether the eye is open or closed based on at least one of (a) the determined confidence value for the best-fit ellipse, (b) a major axis of the best-fit ellipse, (c) a minor axis of the best fit ellipse, (d) a ratio of the major axis of the best-fit ellipse to the minor axis of the best-fit ellipse, or (e) a difference in pixel intensity between pixels located inside the best-fit ellipse and pixels located outside the best-fit ellipse.

10. The method of claim 1, wherein the respective confidence value for each fitted ellipse is further based on a grayscale value of pixels enclosed by each fitted ellipse.

11. A method comprising:
    capturing an image of an eye;
    based on the image, determining a best-fit ellipse with respect to a pupil of the eye using a pixel intensity gradient method, wherein the pixel intensity gradient method comprises:
        generating a plurality of ellipses, wherein each ellipse of the plurality of ellipses comprises a respective elliptical arrangement of pixels of the captured image;
        superimposing each ellipse of the plurality of ellipses on the image of the eye;

for each ellipse of the plurality of ellipses, determining a pixel intensity gradient, wherein the pixel intensity gradient is based on a difference in pixel intensity between pixels located inside each respective ellipse and pixels located outside each respective ellipse; and determining the best-fit ellipse based on the respective pixel intensity gradient(s);

determining, based on the best-fit ellipse, at least one of a gaze direction of the eye or a pupil dimension of the eye; and determining coordinates of a center point of the eye, wherein determining the coordinates comprises:

capturing a plurality of images of the eye;

for each image of the plurality of images, determining the best-fit ellipse for the pupil of the eye;

for each of the determined best-fit ellipses, determining two circles in three-dimensional space that each project onto a respective best-fit ellipse in two-dimensional space, wherein the two circles have the same center point and radius, and wherein vectors normal to the two circles have the same scalar components along two dimensions and different scalar components along a third dimension;

based on the two circles having the same scalar components along the two dimensions, determining coordinates of the center point of the eye for the two dimensions; and based on the vectors normal to the circles, determining a coordinate of the center point of the eye for the third dimension, wherein the coordinate for the third dimension is an intersection point of the vectors along the third dimension.

12. The method of claim 11, wherein determining the gaze direction of the eye comprises:

based on the best-fit ellipse for the pupil of the eye, determining an orientation of the pupil using projective geometry; and based on the determined orientation of the pupil, determining the gaze direction of the eye.

13. The method of claim 12, wherein determining the gaze direction of the eye comprises:

for at least one of the best-fit ellipses, determining that one of the two determined circles corresponds with the pupil of the eye based on its normal vector pointing toward the center point of the eye; and determining the gaze direction of the eye based on the normal vector of the circle corresponding with the pupil of the eye.

14. The method of claim 13, wherein determining, based on the best-fit ellipse for the pupil of the eye, at least one of the gaze direction of the eye or the pupil dimension of the eye comprises determining a radius of the pupil, and wherein determining the radius of the pupil comprises:

for the one of the two circles corresponding with the pupil, determining a radius of the circle that minimizes an angle between the gaze direction and a vector directed from the center point of the eye to the center point of the circle.

15. The method of claim 12, wherein capturing the plurality of images of the eye comprises capturing the plurality of images of the eye using a head-mountable device (HMD), and wherein the method further comprises:

based on the determined coordinates of the center point of the eye, determining a change in position over time of the HMD with respect to the eye.

16. The method of claim 11, further comprising:

determining whether the eye is open or closed based on the determined pixel intensity gradient of the best-fit ellipse.

17. A system comprising:

a camera positioned for capturing an image of an eye;

a processor; and a non-transitory computer-readable medium including program instructions that, when executed by the processor, cause performance of a set of functions comprising:

causing the camera to capture an image of the eye;

based on the image, determining a set of pixels corresponding with an edge of a pupil of the eye;

selecting at least one subset of pixels from the set of pixels corresponding with the edge of the pupil;

fitting an ellipse to each subset of pixels;

determining a respective confidence value for each fitted ellipse based on a distance between each pixel of the set of pixels and an edge of the respective fitted ellipse;

determining a best-fit ellipse based on the respective confidence value(s); and determining, based on the best-fit ellipse for the pupil of the eye, at least one of a gaze direction of the eye or a pupil dimension of the eye.

18. The system of claim 17, the set of functions further comprising:

causing the camera to capture a plurality of images of the eye; and determining coordinates of a center point of the eye, wherein determining the coordinates comprises:

for each image of the plurality of images, determining the best-fit ellipse for the pupil of the eye;

for each of the determined best-fit ellipses, determining two circles in three-dimensional space that each project onto a respective best-fit ellipse in two-dimensional space, wherein the two circles have the same center point and radius, and wherein vectors normal to the two circles have the same scalar components along two dimensions and different scalar components along a third dimension;

based on the two circles having the same scalar components along the two dimensions, determining coordinates of the center point of the eye for the two dimensions; and based on the vectors normal to the circles, determining a coordinate of the center point of the eye for the third dimension, wherein the coordinate for the third dimension is an intersection point of the vectors along the third dimension.

19. The system of claim 18, wherein determining the gaze direction of the eye comprises:

for at least one of the best-fit ellipses, determining that one of the two determined circles corresponds with the pupil of the eye based on its normal vector pointing toward the center point of the eye; and determining the gaze direction of the eye based on the normal vector pointing toward the center point of the eye.

* * * * *